(Model.)

O. E. WORDEN.
FRYING PAN.

No. 283,314. Patented Aug. 14, 1883.

WITNESSES:
Francis McArdle.
C. Sedgwick

INVENTOR:
O. E. Worden
BY Munn & Co
ATTORNEYS.

UNITED STATES PATENT OFFICE.

OLIVER E. WORDEN, OF PIERRE, DAKOTA TERRITORY, ASSIGNOR TO HIMSELF AND MAX J. SCHUBERT, OF SAME PLACE.

FRYING-PAN.

SPECIFICATION forming part of Letters Patent No. 283,314, dated August 14, 1883.

Application filed May 11, 1883. (Model.)

*To all whom it may concern:*

Be it known that I, OLIVER E. WORDEN, of Pierre, in the county of Hughes and Territory of Dakota, have invented a new and Improved Frying-Pan, of which the following is a full, clear, and exact description.

The object of my improvement in frying-pans is to do away with the smoke that results from frying meats and other articles of food, and also to prevent grease from flying or spattering out of the pan.

Reference is to be had to the accompanying drawings, forming a part of this specification, in which similar letters of reference indicate corresponding parts in both the figures.

Figure 1:
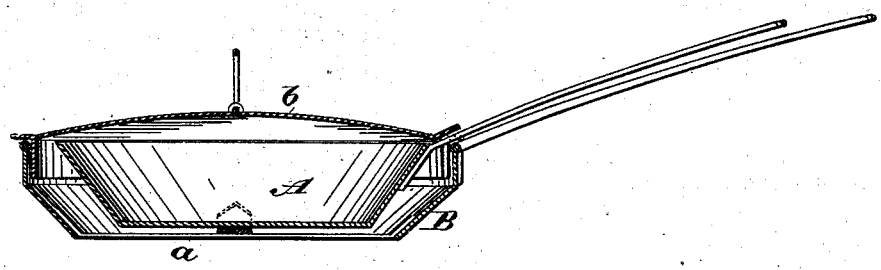
Figure 2:
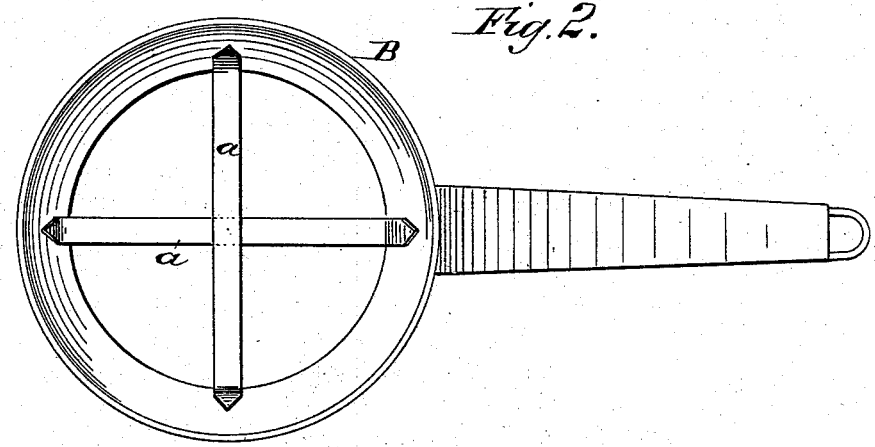

Figure 1 is a sectional elevation, and Fig. 2 an inverted plan view, of my improved frying-pan.

The inner frying-pan, A, is of ordinary construction. The outer pan, B, is made larger in diameter than the frying-pan, so as to give a space between the two, and it is formed with an open bottom, having cross-bars $a$ for supporting the inner pan. The outer pan is also provided with a removable cover, $b$, which has its downward flange cut away to fit over the handle of inner pan, and the adjacent metal slit on each side and raised so that the cover will fit securely down on the outer pan.

In use the frying-pan A is placed within the outer pan, and the two being then placed upon the stove with the cover $b$ in place, the heat has free access to the bottom of the inner pan, and at the same time the smoke will be drawn down at the sides of the inner pan and through the bottom of the outer pan into the stove, as the cover $b$ prevents its escape into the room, and also prevents the spattering or flying of grease.

I am aware that it is not broadly new to use an outer open-bottomed pan with a removable cover in combination with a frying-pan; but What I do claim as new is—

The combination of the inner and outer pans, A B, the latter supporting the former at its open bottom on cross-bars $a\ a$, and provided with a cover, $b$, fitting over the handle of pan A, as shown and described.

OLIVER E. WORDEN.

Witnesses:
H. E. DEWEY,
G. H. BRONTE.